United States Patent
Rodrigues et al.

(10) Patent No.: US 8,619,411 B2
(45) Date of Patent: Dec. 31, 2013

(54) SWITCHGEAR BUS ASSEMBLY HAVING REDUCED POWER LOSS, MATERIAL AND TEMPERATURE

(75) Inventors: Carlton R. Rodrigues, Mount Juliet, TN (US); Mark J. Fisher, Murfreesboro, TN (US); Nicholas J. Pasquerilla, Murfreesboro, TN (US); Mauricio Diaz, Nuevo Leon (MX); Jose Carlos Suarez, Nuevo Leon (MX)

(73) Assignee: Schneider Electric, USA, Inc., Palatine, IL (US)

( * ) Notice: Subject to any disclaimer, the term of this patent is extended or adjusted under 35 U.S.C. 154(b) by 245 days.

(21) Appl. No.: 13/288,499

(22) Filed: Nov. 3, 2011

(65) Prior Publication Data

US 2013/0114185 A1    May 9, 2013

(51) Int. Cl.
  *H02B 1/20*    (2006.01)
(52) U.S. Cl.
  USPC ........... 361/611; 361/637; 361/639; 361/648; 361/650; 174/68.2; 174/72 B
(58) Field of Classification Search
  None
  See application file for complete search history.

(56) References Cited

U.S. PATENT DOCUMENTS

| | | | | |
|---|---|---|---|---|
| 5,949,641 A * | 9/1999 | Walker et al. | | 361/600 |
| 6,034,861 A * | 3/2000 | Meiners et al. | | 361/115 |
| 6,381,122 B2 * | 4/2002 | Wagener | | 361/611 |
| 6,489,567 B2 * | 12/2002 | Zachrai | | 174/149 B |
| 6,506,068 B2 * | 1/2003 | Wagener | | 439/213 |
| 6,934,147 B2 * | 8/2005 | Miller et al. | | 361/611 |
| 7,224,577 B2 * | 5/2007 | Wiant et al. | | 361/605 |
| 7,329,813 B2 * | 2/2008 | Josten et al. | | 174/68.2 |
| 7,558,053 B2 * | 7/2009 | Moore et al. | | 361/611 |
| 7,719,823 B2 * | 5/2010 | Josten et al. | | 361/611 |
| 7,952,025 B2 | 5/2011 | Diaz et al. | | 174/68.2 |
| 8,379,374 B2 * | 2/2013 | Keegan | | 361/637 |
| 8,456,807 B2 * | 6/2013 | Tallam et al. | | 361/637 |

FOREIGN PATENT DOCUMENTS

| | | |
|---|---|---|
| EP | 1619766 | 1/2006 |
| JP | 2007135298 | 5/2007 |
| WO | WO2009/090117 | 7/2009 |
| WO | WO2010/077594 | 7/2010 |

OTHER PUBLICATIONS

International Search Report, mailed Jan. 25, 2013, issued in corresponding International Patent Application No. PCT/US2012/062910 (6 pages).
Written Opinion, mailed Jan. 25, 2013, issued in corresponding International Patent Application No. PCT/US2012/062910 (6 pages).

* cited by examiner

*Primary Examiner* — Boris Chervinsky
(74) *Attorney, Agent, or Firm* — Locke Lord LLP

(57) ABSTRACT

Electrical switchgear comprising electrical switching equipment for a multi-phase electrical power distribution system, a supporting structure for a bus assembly for supplying electrical current to the switching equipment, and a plurality of spaced buses mounted on the supporting structure each for connecting the switching equipment to respective phases of the multi-phase electrical power distribution system. Each bus comprises a plurality of substantially co-planar, spaced, elongated flat conductors arranged with at least one longitudinal edge surface of each conductor in that bus opposed to and spaced from a longitudinal edge surface of another conductor in that same bus, and a connector at each end of said conductors for connecting the plurality of flat conductors in each bus to each other.

13 Claims, 4 Drawing Sheets

SWITCHGEAR BUS ASSEMBLY HAVING REDUCED POWER LOSS, MATERIAL AND TEMPERATURE

FIELD OF THE INVENTION

The present invention relates to bus systems for electrical switchgear, and more particularly, to electrical power bus systems for use with such equipment.

BACKGROUND OF THE INVENTION

Electrical switchgear, including switchboards and motor control centers, use conductors known as "buses" to connect circuit breakers and other protection equipment to loads. Existing conductors include one or more flat conductors depending upon the desired current rating or ampacity of the distribution equipment. As the length of these conductors increases, the power loss dissipated across the conductors increases and the temperature of the surrounding air increases due to natural convection, resulting in poor thermal dissipation and higher temperatures in the switchgear current distribution. In the case of flat conductors, to counteract the adverse thermal effects, multiple flat conductors are stacked together, but at the cost of an increase in the amount of expensive copper. For example, one well known bus system uses four laminated conductors for each phases of a three-phase system, and each laminated conductor has two conductors, for a total of eight conductors per phase.

Because of increased conductor volume, laminated flat conductors exhibit relatively poor current distribution due to the "skin effect" phenomenon, which holds that the current density near the surface of the conductor is greater than at its core. Moreover, in multi-phase systems, adjacent conductors of different phases are subjected to another phenomenon called the "proximity effect," which relates to how current flowing through one phase interferes with current flowing through an adjacent phase. As a result of the proximity effect, current in a conductor tends to crowd towards or away from the side closest to a conductor of an adjacent phase, depending on the current direction in each of the conductors. As a result, some portions of conductors of one phase experience uneven current distribution within the conductors composing a conducting phase.

SUMMARY OF THE INVENTION

Electrical switchgear typically comprises electrical switching equipment for a multi-phase electrical power distribution system, a supporting structure for a bus assembly for supplying electrical current to the switching equipment, and a plurality of spaced buses mounted on the supporting structure and connecting the switching equipment to respective phases of the multi-phase electrical power distribution system. It has been found that a unique arrangement of the multiple flat conductors in the individual buses for the different phases provides improved uniformity of current distribution, which in turn reduces power losses and temperatures. As a result, the amount of conductive material required in each of multiple phase buses is reduced for any given current rating, which in turn reduces the cost, size and weight of the bus assembly and thus of the switchgear. For example, in one embodiment, it has been found that this invention permits a 25% reduction in the amount of conductive material needed in the bus assemblies of certain switchgear designed to handle three-phase power at current ratings of 4000 amperes. The improved uniformity of current distribution also reduces "hot spots."

In one embodiment, each bus comprises a plurality of spaced, elongated flat conductors arranged with at least one longitudinal edge surface of each elongated conductor in that bus opposed to and spaced from a longitudinal edge surface of another elongated conductor in that same bus. Each flat side surface of the elongated conductors in each bus are preferably substantially co-planar with the corresponding side surfaces of all the other elongated conductors in that same bus. The plurality of flat conductors in each bus are electrically connected to each other by multiple connectors, which in one implementation extend across, and are electrically connected to, all the elongated conductors in any given bus.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
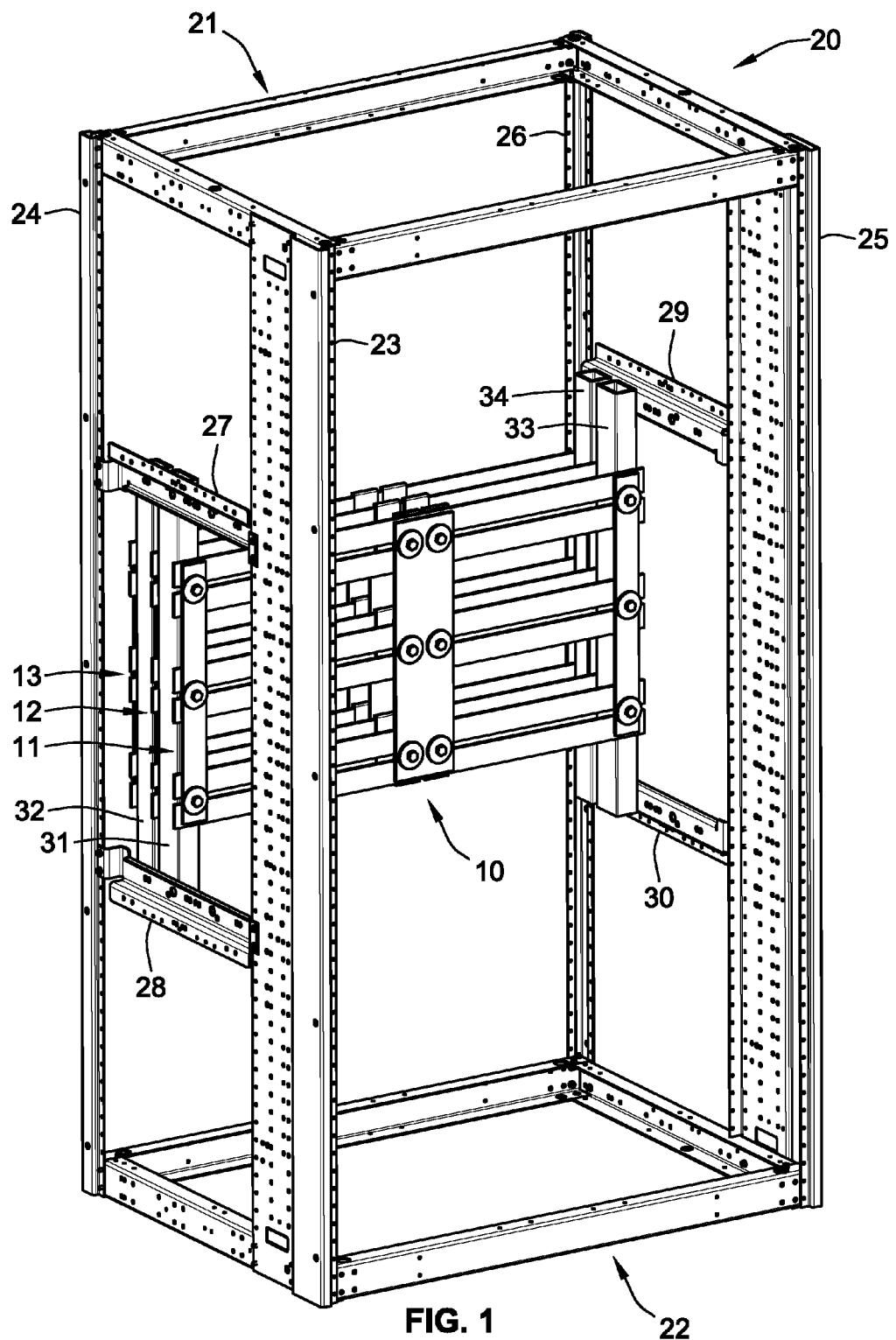
FIG. 1 is a front perspective view of a bus system and its supporting structure, for switching equipment in a three-phase electrical power distribution system.
Figure 2:
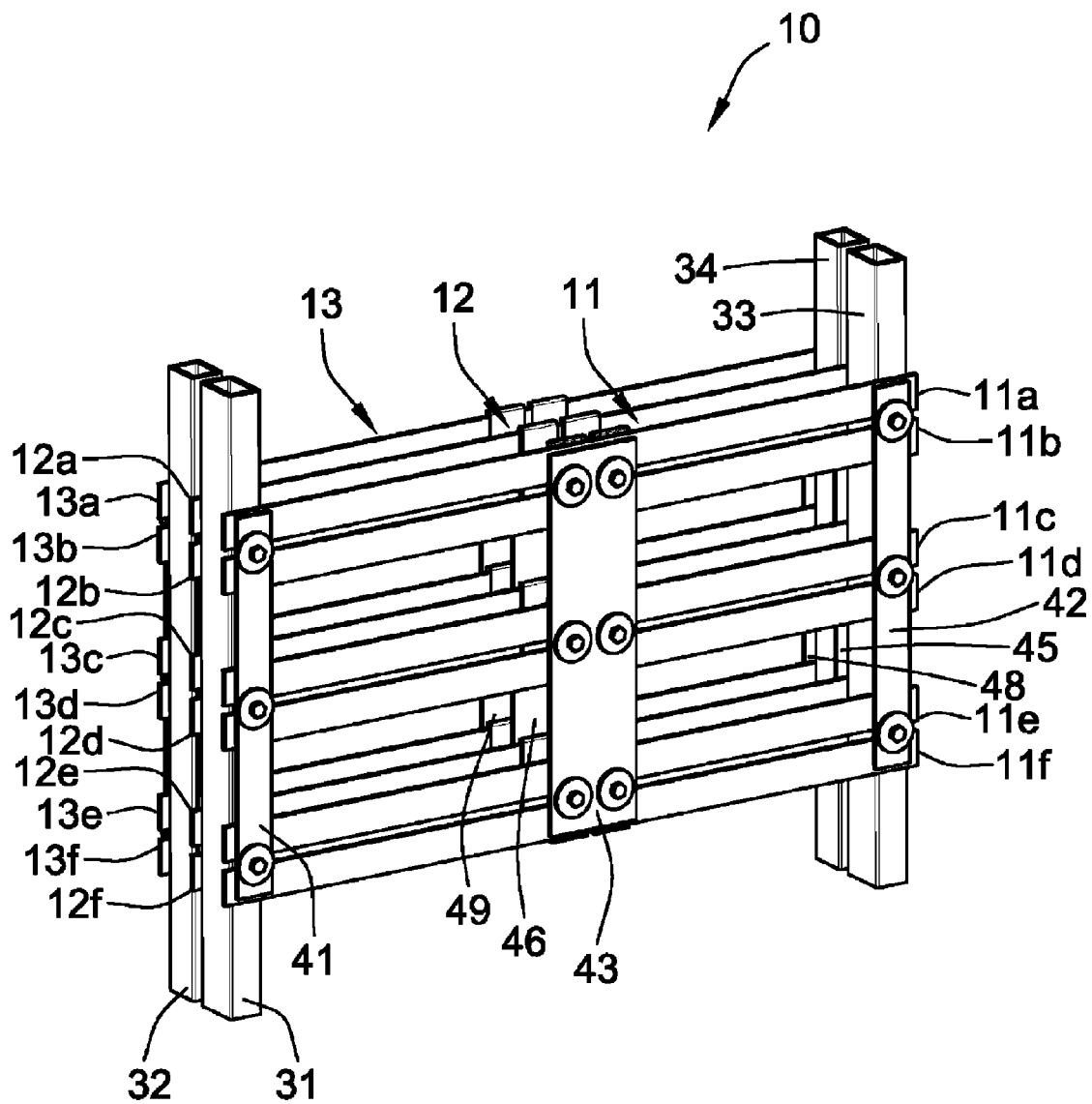
FIG. 2 is an enlarged front perspective view of the bus system and supporting posts shown in FIG. 1.

Turning now to the drawings and referring first to FIGS. 1 and 2, a bus assembly 10 for three-phase electrical distribution switchgear (not shown) includes three phase buses 11, 12 and 13, one for each of the three phases. The conductors in the buses 11-13 are made of an electrically conductive material such as copper, aluminum, etc.

The buses 11-13 are typically mounted on a supporting structure, which in the illustrative embodiment is a cage 20 that includes two horizontal rectangular end frames 21 and 22 connected to each other by four vertical corner posts 23-26. A first pair of horizontal rails 27 and 28 extend between, and are connected to, the posts 23 and 24, and a second pair of horizontal rails 29 and 30 extend between, and are connected to, the posts 25 and 26. The elements 21-30 of the cage 20 are all formed from a conductive material such as steel, which is grounded. The cage housing the bus assembly and other electrical components like circuit breakers, etc., is further covered by steel panels (not shown), with the exception of ports/openings for metering and switches.

A first pair of short vertical support posts 31 and 32 extend between, and are connected to, the two rails 27 and 28 and a second pair of short vertical support posts 33 and 34 extend between, and are connected to, the two rails 29 and 30. The three buses 11-13 are mounted on the posts 31-34, with the first bus 11 fastened to the front sides of the posts 31 and 33, the second bus 12 fastened to the rear sides of the posts 31 and 33, and the third bus 13 fastened to the rear sides of the posts 32 and 34. The two front posts 31 and 33 are of similar width as the rear posts 32 and 34, approximating the distance between the two posts in each pair, so that the spacing between each pair of adjacent buses (i.e., between the first pair of adjacent buses 11 and 12 and the second pair of adjacent buses 12 and 13) is substantially the same.

In the illustrative embodiment, each of the three buses 11-13 includes six conductors that are electrically connected to each other. For example, referring to FIG. 2, the front bus 11 includes three pairs of horizontal conductors 11a and 11b, 11c and 11d, and 11e and 11f. Likewise, the second horizontal bus 12 includes a second set of three pairs of horizontal conductors 12a and 12b, 12c and 12d, and 12e and 12f, and the third horizontal bus 13 includes a third set of three pairs of horizontal conductors 13a and 13b, 13c and 13d, and 13e and 13f. In the illustrative embodiment, the six conductors in each bus are coplanar, and the conductors in all the buses are parallel to each other.

Figure 3:
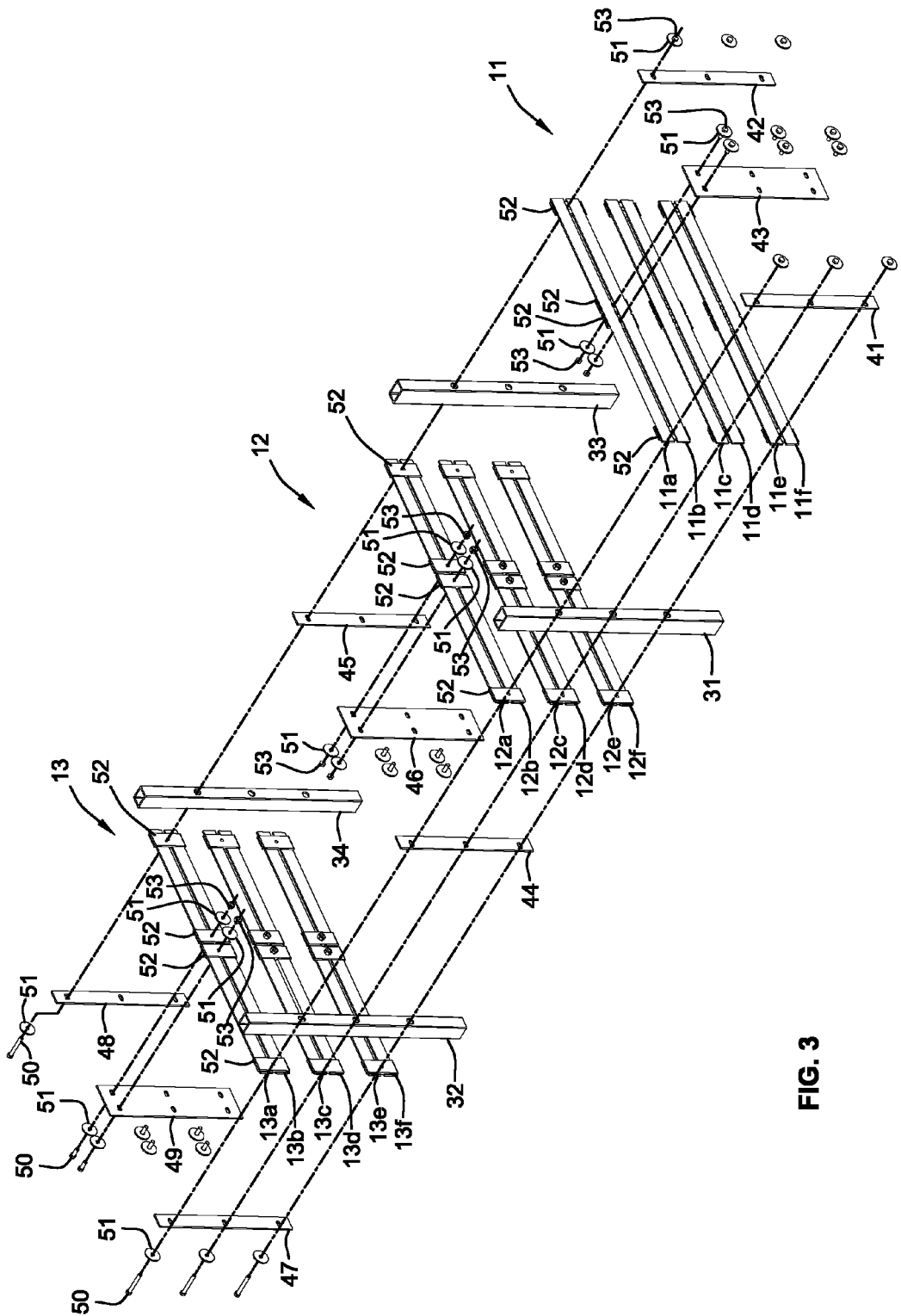
FIG. 3 is an exploded perspective view of the bus system shown in FIG. 2.
Figure 4:
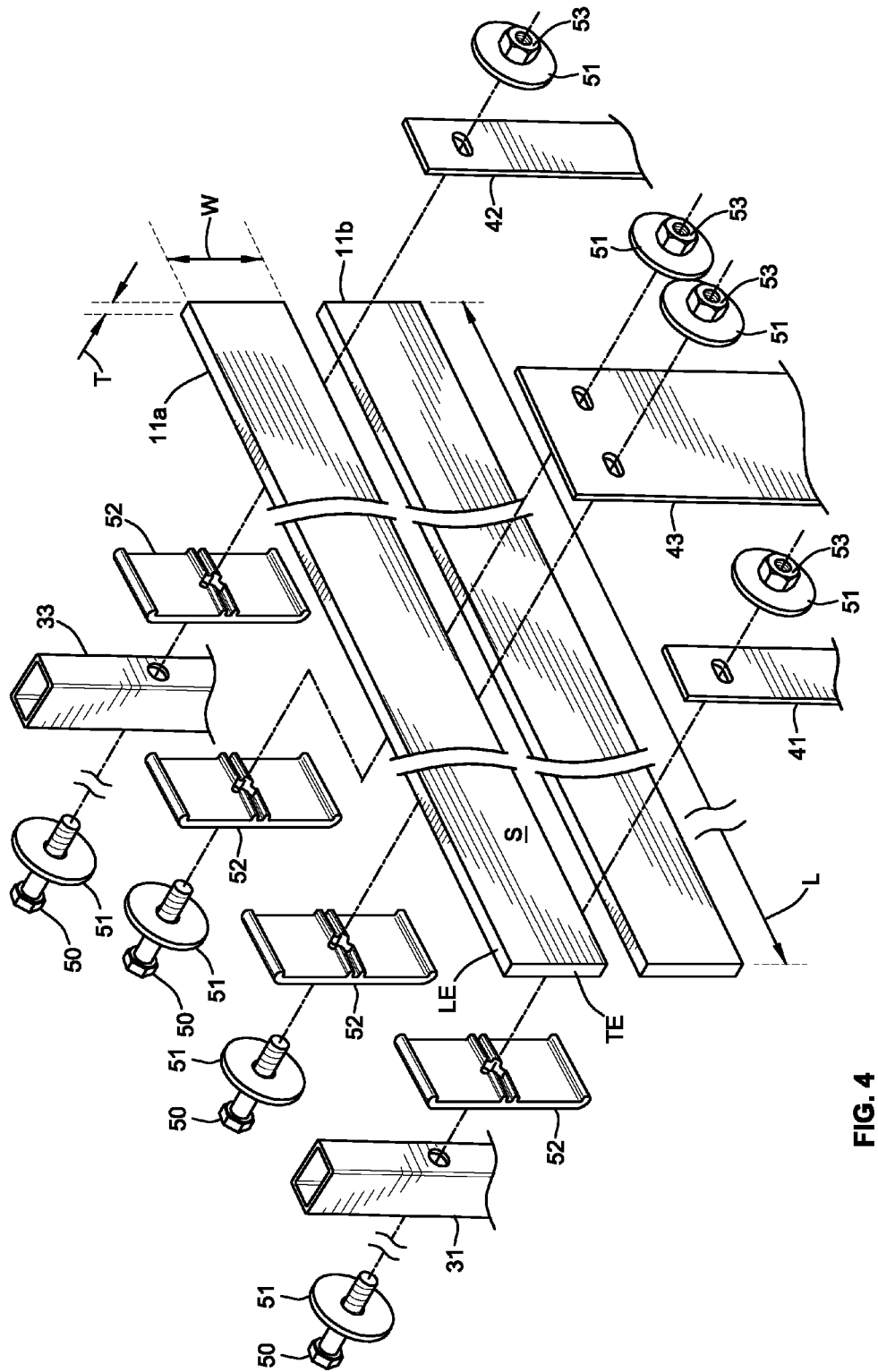
FIG. 4 is an enlarged perspective view of the components associated with two of the conductors in the bus system shown in FIG. 3, with the addition of symbols identifying the dimensions and surfaces of the conductors.

As depicted in FIGS. 3 and 4, each of the individual conductors in each bus is an elongated flat bar having a length L, a width W and a thickness T (see FIG. 4). Each of the two side surfaces S has an area of L×W, each longitudinal edge surface LE has an area L×T, and each transverse (end) surface TE has an area W×T. Each individual phase bus has six conductors, with two side surfaces S per conductor, that lie in the same planes, i.e., are co-planar. The longitudinal edge surfaces LE of adjacent conductors are opposed to and spaced apart from each other. In one exemplary bus arrangement for use in a three-phase switch gear system, each conductor has a width W of 2.5 inches and a thickness of 0.25 inch.

To electrically connect the six conductors in each bus to each other, a pair of end connectors and a center connector are fastened to one side of the six conductors. Specifically, in the bus 11, two end connectors 41 and 42 and a center connector 43 extend across, and are electrically connected to, the flat side surfaces S on the front sides of the six conductors 11a-11f. Similarly, in the bus 12, two end connectors 44 and 45 and a center connector 46 are fastened to the rear side surfaces S of the six conductors 12a-12f, and in the bus 13, two end connectors 47 and 48 and a center connector 49 are fastened to the rear side surfaces S of the six conductors 13a-13f. In bus 11, the three connectors (41, 42 and 43 in FIG. 4) are fastened to the six conductors by bolts 50, washers 51 and nuts 53. As depicted in FIG. 4, each bolt 50 passes through an E clamp 52, the space between two of the conductors (11a and 11b in FIG. 4), and one of the three connectors (41, 42 or 43 in FIG. 4). The bolts 50 for the two end connectors (41 and 42 in FIG. 4) also pass through one of the short support posts (31 or 33 in FIG. 4).

Both the spaces between adjacent conductors within the same bus and the spaces between adjacent buses allow air to flow across the surfaces of the conductors. Hot air rises by convection up between the buses and is allowed to escape to the outside of any enclosure formed on the cage 20, through venting provided at the top of the enclosure, resulting in air exchange between the surfaces of the conductors and air external to the enclosure. The improved current distribution provided by the bus arrangement described above reduces the power loss generated in the system, contributing to a lowering of temperatures in the switchgear. As a result, for the same current rating (also called "ampacity") associated with the conductors in the switchgear, an overall reduction of copper can be achieved using the proposed bus arrangement.

The illustrative buses are "through" buses (without terminals for additional connections of circuit breakers, switches, etc. inside the switchgear), but it will be understood that the same bus arrangements may be provided with front-side terminals for connecting the buses to other equipment like breakers, switches, etc. to be supplied with power. The width of the bus system may vary, here indicated by the variable L, and multiple bus systems may be connected side by side, in adjoining cabinets, for example. To join one bus system to another bus system, for example, the conductors may be extended beyond the supporting posts 31-34, allowing the bus systems to be readily connected to one another. Similarly, to supply power to a standalone bus system or to a first bus system in a series of connected bus systems, the conductors may be extended beyond the supports, allowing power supply lines to be readily connected.

In the bus system of FIGS. 1-4, the individual conductors may be the same as or similar to corresponding conductors of prior bus systems in terms of width and arrangement, changing only the manner in which the conductors are connected to form the three buses for the three phases. Substantial compatibility with prior bus systems may therefore be assured.

The bus assembly 100 shown in the figures is for distribution of three-phase current, but in other aspects, the conductors disclosed herein can be used in single-phase distribution systems.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. Electrical switchgear comprising
electrical switching equipment for a multi-phase electrical power distribution system,
a supporting structure for a bus assembly for supplying electrical current to said switching equipment, and
a plurality of spaced buses mounted on the supporting structure for connecting said switching equipment to respective phases of said multi-phase electrical power distribution system, each of said buses comprising
a plurality of spaced, elongated flat conductors arranged with at least one longitudinal edge surface of each conductor in that bus opposed to and spaced from a longitudinal edge surface of another conductor in that same bus, and with the side surfaces of said plurality of elongated flat conductors in each of said buses being substantially co-planar with the corresponding side surfaces of the other elongated flat conductors in that same bus, and with the side surfaces of the elongated flat conductors in said buses opposing side surfaces of opposed flat conductors in others of said buses, and
a plurality of electrically conductive connectors connecting said plurality of flat conductors in each bus to each other.

2. The electrical switchgear of claim 1 in which said elongated flat conductors in each of said buses have side surfaces that are substantially parallel to and aligned with each other.

3. The electrical switchgear of claim 2 in which said side surfaces of said elongated flat conductors in each of said buses are substantially co-planar.

4. The electrical switchgear of claim 1 in which said opposed longitudinal edges of said conductors are substantially PARALLEL to each other.

5. The electrical switchgear of claim 1 in which said buses are arranged in parallel with and spaced from each other, with side surfaces of the conductors in each of said buses opposing side surfaces of the conductors in another of said buses.

6. The electrical switchgear of claim 1 in which each of said connectors extends across, and is electrically connected to, all the elongated conductors in one of said buses.

7. Electrical switchgear comprising
electrical switching equipment for a multi-phase electrical power distribution system,
a supporting structure for a bus assembly for supplying electrical current to said switching equipment, and
a plurality of spaced buses mounted on said supporting structure for connecting said switching equipment to respective phases of said multi-phase electrical power distribution system, each of said buses comprising
a plurality of conductors in the form of elongated flat bars each of which has a pair of longitudinal flat side surfaces S and a pair of longitudinal edge surfaces LE extending along the length L of the flat bar, said plurality of conductors being arranged with at least one longitudinal edge surface LE of each conductor opposed to and spaced from a longitudinal edge surface LE of an adjacent conductor in that same bus, and with the side surfaces S of said plurality of elongated flat bars in each of said buses being substantially co-planar with the corresponding side surfaces of the other elongated flat bars in that same bus, and with the side surfaces S of the elongated flat bars in said buses opposing side surfaces of opposed flat bars in others of said buses.
a plurality of electrically conductive connectors connecting said plurality of flat conductors in each bus together.

8. The electrical switchgear of claim 7 in which said plurality of elongated flat bars in each of said buses have side surfaces S that are substantially parallel to and aligned with each other.

9. The electrical switchgear of claim 8 in which each side surface S of said plurality of elongated flat bars in each of said buses is substantially co-planar with the corresponding side surfaces of all the other elongated flat bars in that same bus.

10. The electrical switchgear of claim 7 in which said opposed longitudinal edge surfaces of said elongated flat bars in each of said buses are substantially parallel to each other.

11. The electrical switchgear of claim 7 in which said buses are arranged in parallel with and spaced from each other, with the side surfaces S of the elongated flat bars in each of said buses opposing side surfaces of the elongated flat bars in another of said buses.

12. The electrical switchgear of claim 7 in which each of said connectors extends across, and is electrically connected to, all the elongated conductors in one of said busses.

13. Electrical switchgear comprising
electrical switching equipment for an electrical power distribution system,
a supporting structure for a bus assembly for supplying electrical current to said switching equipment, and
at least one bus mounted on the supporting structure for connecting said switching equipment to said electrical power distribution system, said bus comprising
a plurality of spaced, elongated flat conductors arranged with at least one longitudinal edge of each of said conductors opposed to and spaced from a longitudinal edge of another of said conductors, and with the side surfaces of said plurality of elongated flat conductors in each of said buses being substantially co-planar with the corresponding side surfaces of the other elongated flat conductors in that same bus, and with the side surfaces of the elongated flat conductors in said buses opposing side surfaces of opposed flat conductors in others of said buses, and
a plurality of electrically conductive connectors connecting said plurality of flat conductors to each other.

* * * * *